United States Patent
Borzio et al.

(12) 
(10) Patent No.: US 6,517,686 B2
(45) Date of Patent: *Feb. 11, 2003

(54) APPARATUS FOR PURIFICATION OF ELECTRONIC SPECIALTY GASES BY VAPOR PHASE TRANSFILLING

(75) Inventors: John Borzio, Robbinsville, NJ (US); Tracey Jacksier, Lisle, IL (US)

(73) Assignees: L'Air Liquide - Societe Anonyme A Directoire et Conseil de Surveillance pour l'Etude et l'Exploitation des Procedes Georges Claude, Paris (FR); American Air Liquide, Fremont, CA (US); Air Liquide America Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/803,953

(22) Filed: Mar. 13, 2001

(65) Prior Publication Data

US 2001/0015316 A1 Aug. 23, 2001

Related U.S. Application Data

(60) Continuation of application No. 09/238,417, filed on Jan. 28, 1998, now Pat. No. 6,277,246, which is a division of application No. 08/794,346, filed on Feb. 3, 1997, now Pat. No. 6,004,433.

(51) Int. Cl.[7] .............................. B01D 3/42; B01D 3/10
(52) U.S. Cl. .................. 202/160; 202/205; 202/233; 202/182; 202/185.1; 62/620; 96/112
(58) Field of Search ............................ 202/160, 182, 202/185.1, 205, 233, 200, 201; 55/267; 62/620, 617; 96/112, 403, 401; 137/205, 220; 159/44; 203/2

(56) References Cited

U.S. PATENT DOCUMENTS

| | | | |
|---|---|---|---|
| 2,463,188 A | 3/1949 | Latchum, Jr. |
| 2,797,145 A | 6/1957 | Gilbert et al. |
| 3,616,437 A | 10/1971 | Yagishita |
| 3,635,664 A | 1/1972 | Morimoto |
| 3,686,076 A | 8/1972 | Cupples et al. |
| 4,036,939 A | 7/1977 | Duhayon et al. |
| 4,169,054 A | 9/1979 | Capepello et al. |
| 4,219,725 A | 8/1980 | Groninger |

(List continued on next page.)

FOREIGN PATENT DOCUMENTS

| | | |
|---|---|---|
| CA | 0686420 | 5/1964 |
| DE | 858 103 | 12/1952 |
| EP | 0640368 | 3/1995 |
| EP | 0792671 | 9/1997 |
| EP | 0816530 | 1/1998 |
| JP | 0005391 | 3/1979 |

OTHER PUBLICATIONS

F. Rodriquez and L. Martinez, "*Purification of Hydrochloric Acid by Isooctaine Extraction, Solvent Extraction and Ion Exchange*", A Companion Journal to Separation Science and Technology, vol. 11, No. 2, 1993, pp. 239–257.

(List continued on next page.)

*Primary Examiner*—Virginia Manoharan
(74) *Attorney, Agent, or Firm*—Linda K. Russell

(57) ABSTRACT

A system and method for purifying liquefied corrosive gases of metallic impurities is described. The principle for this purification method relies on vapor-phase transfilling the vapor phase from a source container into a receiving container. This method has been observed to decrease metal concentrations by a factor of at least 1000 and, decreases the metallic impurity levels in the resulting condensate. The vapor transfer is accomplished by controlled differential pressure rather than mechanical pumping, thereby generating no particle or metal impurities.

14 Claims, 3 Drawing Sheets

U.S. PATENT DOCUMENTS

| | | |
|---|---|---|
| 4,222,997 A | 9/1980 | Beecher |
| 4,365,969 A | 12/1982 | Karpov et al. |
| 4,368,058 A | 1/1983 | Crowley et al. |
| 4,382,916 A | 5/1983 | Beecher |
| 4,406,748 A * | 9/1983 | Hoffman .................... 202/233 |
| 4,462,976 A | 7/1984 | Karger |
| 4,549,889 A | 10/1985 | Yamazaki |
| 4,622,102 A | 11/1986 | Diebel |
| 4,663,145 A | 5/1987 | Van den Berk et al. |
| 4,892,625 A | 1/1990 | Shimizu et al. |
| 4,936,955 A | 6/1990 | Dobson et al. |
| 4,980,032 A | 12/1990 | Dobson et al. |
| 4,990,321 A | 2/1991 | Sato et al. |
| 5,236,555 A | 8/1993 | Yuan |
| 5,256,374 A | 10/1993 | De Silva et al. |
| 5,328,670 A | 7/1994 | Hirabayashi et al. |
| 5,354,428 A | 10/1994 | Clark et al. |
| 5,359,787 A | 11/1994 | Mostowy, Jr. et al. |
| 5,374,300 A | 12/1994 | Kaschemekat et al. |
| 5,374,327 A | 12/1994 | Imahashi et al. |
| 5,417,955 A | 5/1995 | Connolly |
| 5,426,944 A | 6/1995 | Li et al. |
| 5,470,421 A | 11/1995 | Nakada et al. |
| 5,591,273 A | 1/1997 | Tsukamoto et al. |
| 5,632,866 A | 5/1997 | Grant |
| 5,665,208 A | 9/1997 | Giesselman |
| 5,665,902 A | 9/1997 | Wang et al. |
| 5,670,028 A | 9/1997 | Inaba et al. |
| 5,846,386 A | 12/1998 | Hoffman et al. |
| 6,098,425 A * | 8/2000 | Stothers ...................... 62/635 |

OTHER PUBLICATIONS

Stephen M. Fine and Philip B. Henderson, "What is the Shelf–Life of Electronics Specialty Gases?", Proceedings–Institute of Environmental Sciences, 1996, pp. 62–70.

T. Jacksier et al., "Particle–and Vapor–Phase Contributions to Metallic Impurities in Electronic–Grade Chlorine", Analytical Chemistry, vol. 66, No. 14, Jul., 1994, p. 2279–2284.

* cited by examiner

Iron Concentration in Gas and Liquid Phases

APPARATUS FOR PURIFICATION OF ELECTRONIC SPECIALTY GASES BY VAPOR PHASE TRANSFILLING

This application is a continuation, of application Ser. No. 09/238,417, filed Jan. 28, 1998 now U.S. Pat. No. 6,277,246, which is a divisional of application Ser. No. 08/794,346, filed Feb. 3, 1997, now U.S. Pat. No. 6,004,433.

BACKGROUND OF THE INVENTION

1. Field of the Invention

The invention generally relates to a purification system, and in particular relates to a method for purifying corrosive liquefied gases of metal impurities.

2. Brief Description of the Related Art

The purification of vapor phase impurities has been described for electronic specialty gases such as HCl. These methods have taken advantage of the gaseous purification features predicted by the phase diagram equilibrium thermodynamics. Additional methods have used chemisorption of gaseous impurities (Tsvetn. Met, (2), 67–71, 1995), solvent extraction of organic compounds (Solvent Extr. Ion Exch. 11(1), 239–57, 1993), and use of activated carbon for removal of C1–C3 chlorinated hydrocarbons (Japan Kokai Tokkyo Koho, JP 03265503 A2), for example.

A trend in Very Large Scale Integration ("VLSI"), e.g., integrated circuit ("IC"), technology is the requirement for very clean reagents used in chemical processes to eliminate defects in the IC caused by impurities diffusing into the semiconductor bulk. This increasing demand with regard to purity levels is becoming more stringent, requiring in some cases very low part-per-billion (ppb) levels of metals. These metals include, but are not limited to, aluminum, calcium, cobalt, sodium, zinc, iron, nickel, chromium, molybdenum, copper, manganese, magnesium, and arsenic.

Semiconductor manufacturing processes have turned to using ultra-high purity corrosive liquefied gases such as $BCl_3$, HBr, HCl, and $Cl_2$, for dry etching and cleaning. These gases are typically delivered to the user in a steel or stainless steel, internally Ni-phosphide-coated cylinder or container which contains the liquid-phase corrosive gases. Semiconductor manufacturers require that the corrosive gases be substantially free of metallic impurities, and as a result, higher purity is required in both gas and liquid phases.

It is known that the liquid phase of corrosive gases usually contains much higher levels of metal impurities in the cylinder. See "Analysis of hydrogen chloride for metals contamination", Institute of Environmental Sciences 1996, proceeding by BOC; "What is the shelf life of electronics specialty gases?", Institute of Environmental Sciences 1996, proceeding by Air Products and Chemicals, Inc. This is because many metal compound impurities which are included in corrosive liquefied gases have lower vapor pressures than the corrosive matrix gases. The metals can be in particle form or dissolved in the liquid phase of the gas. Some of these metal impurities originate from the source product, and some come from corrosion of the filling system or from the cylinder/container during storage.

Normally, high purity liquefied corrosive gases are purified by classical distillation to remove some impurities and stored in a metal-based storage tank from which it is transferred into the final cylinders/containers in their liquid phases at the production site. However, such liquid-phase filling of the final cylinder/container can introduce metallic impurities from the production facilities into the final cylinder.

It is therefore an object of the present invention to provide a more efficient method and apparatus for the removal of metal impurities and metal contamination of liquified gas during gas-phase filling of an intermediate or the final cylinder/container.

It is another object of the present invention to provide an economical method to effectively purify liquified corrosive gas of metal impurities, immediately followed by filling of the final cylinder/container with the purified gas.

SUMMARY OF THE INVENTION

In accordance with the foregoing objectives, the present invention provides an apparatus for purifying a compound in liquid phase which contains at least one impurity. The apparatus comprises a first container for holding the liquid-phase compound containing the at least one impurity, a second container for holding purified compound, and a first fluid line in fluid communication with the first container and with the second container for transferring gas-phase compound from the first container to the second container. A temperature controller is provided for maintaining a temperature differential between the first container and the second container, the temperature controller maintaining the compound in gas phase when the compound is transferred from the first container to the second container. The temperature controller liquefies the compound when the compound is in the second container, so that when the gas-phase compound is transferred from the first container to the second container, the at least one impurity is not transferred from the first container to the second container.

According to another embodiment of the invention, a transfilling method for removing at least one impurity from a liquid-phase compound comprises the steps of providing a compound in liquid phase containing at least one impurity in a first container at a temperature above the boiling point of said compound in liquid phase and providing a second container in fluid communication with said first container through at least a first fluid line. The compound is transferred from the first container through the first fluid line to the second container by pressure differential, wherein the compound in the second container which has been transferred from the first container includes a reduced concentration of impurity compared to the compound in the first container.

According to yet another embodiment of the invention, a method of removing at least one impurity from a liquid-phase compound comprises the steps of providing a compound in liquid phase containing at least one impurity in a first container, wherein the partial pressure of the gas phase of the compound in the first container is substantially greater than the partial pressure of the gas phase of the at least one impurity in the container. A gas-phase compound is generated by maintaining the liquid-phase compound and the at least one impurity at a temperature above the boiling point of the liquid-phase compound. The gas-phase compound is then transferred to a second container by a pressure differential.

The invention will be more fully understood with reference to the following detailed description of the invention and drawing figures.

DESCRIPTION OF THE PREFERRED EMBODIMENTS

Figure 1:
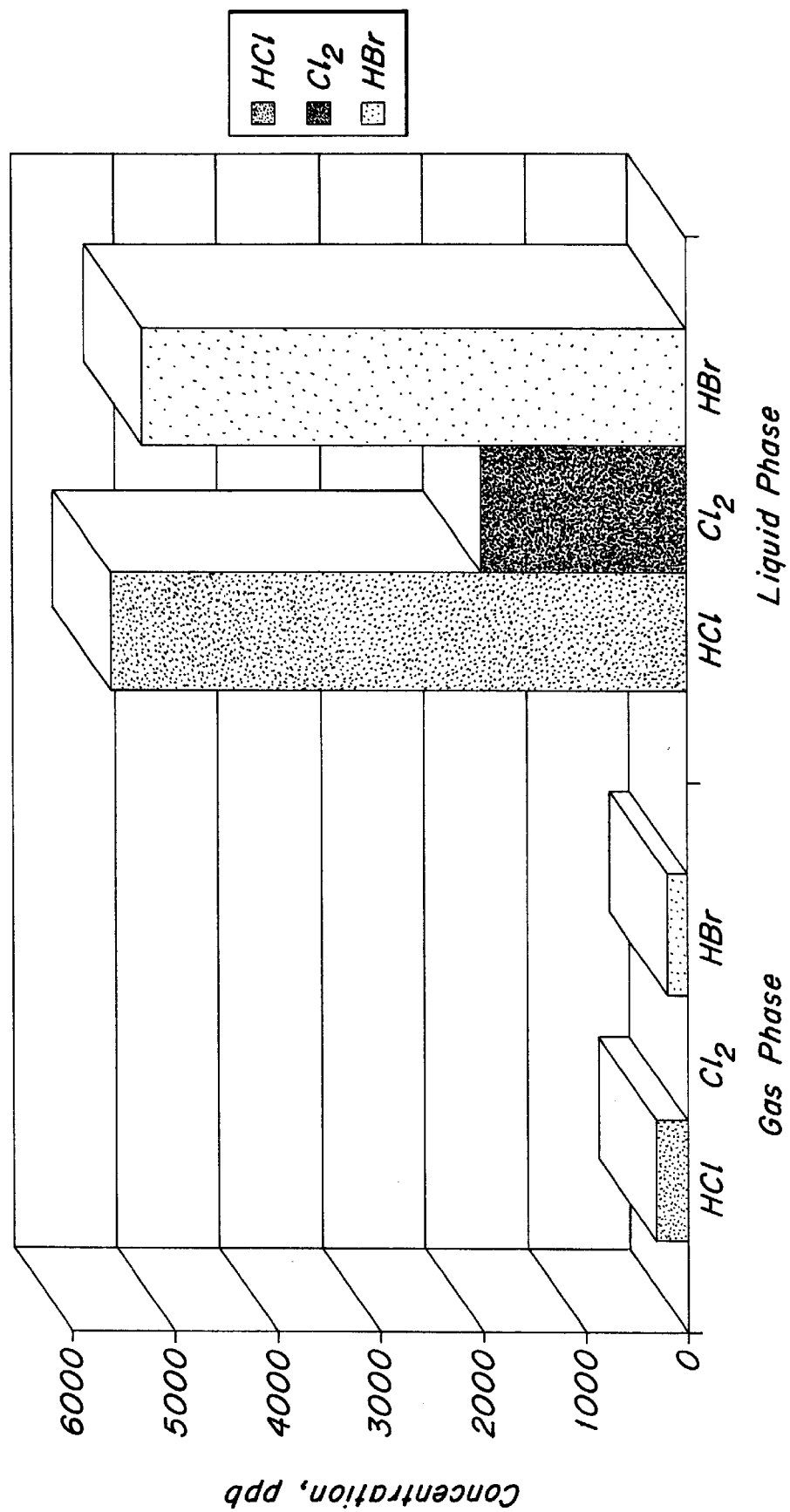
FIG. 1 is a chart showing Iron concentrations in the gas and liquid phases of several corrosive gases.

It has been determined that the majority of metallic impurities (as used herein, meaning salts of metal atoms, e.g., halogen salts) in corrosive gases are in the liquid phase of the corrosive gas. The difference in iron concentration between the liquid and gas phases of several corrosive gases is tabulated in Table 1 and illustrated in FIG. 1. Similar distributions are observed for the other metals of interest. Owing to the significant difference in metal concentration between the liquid and gas phases, recondensing the gas phase decreases the metallic impurity concentration levels in the resulting liquid phase. Furthermore, by allowing the vapor transfer to occur by controlled differential pressure, rather than pumping, a system and method of transfilling corrosive gases according to the present invention generates substantially no particle or metal impurities.

TABLE 1

| Gas | Gas Phase | Liquid Phase |
|---|---|---|
| HCl | 317 | 5623 |
| $Cl_2$ | 1 | 2000 |
| HBr | 200 | 5336 |

Figure 2:
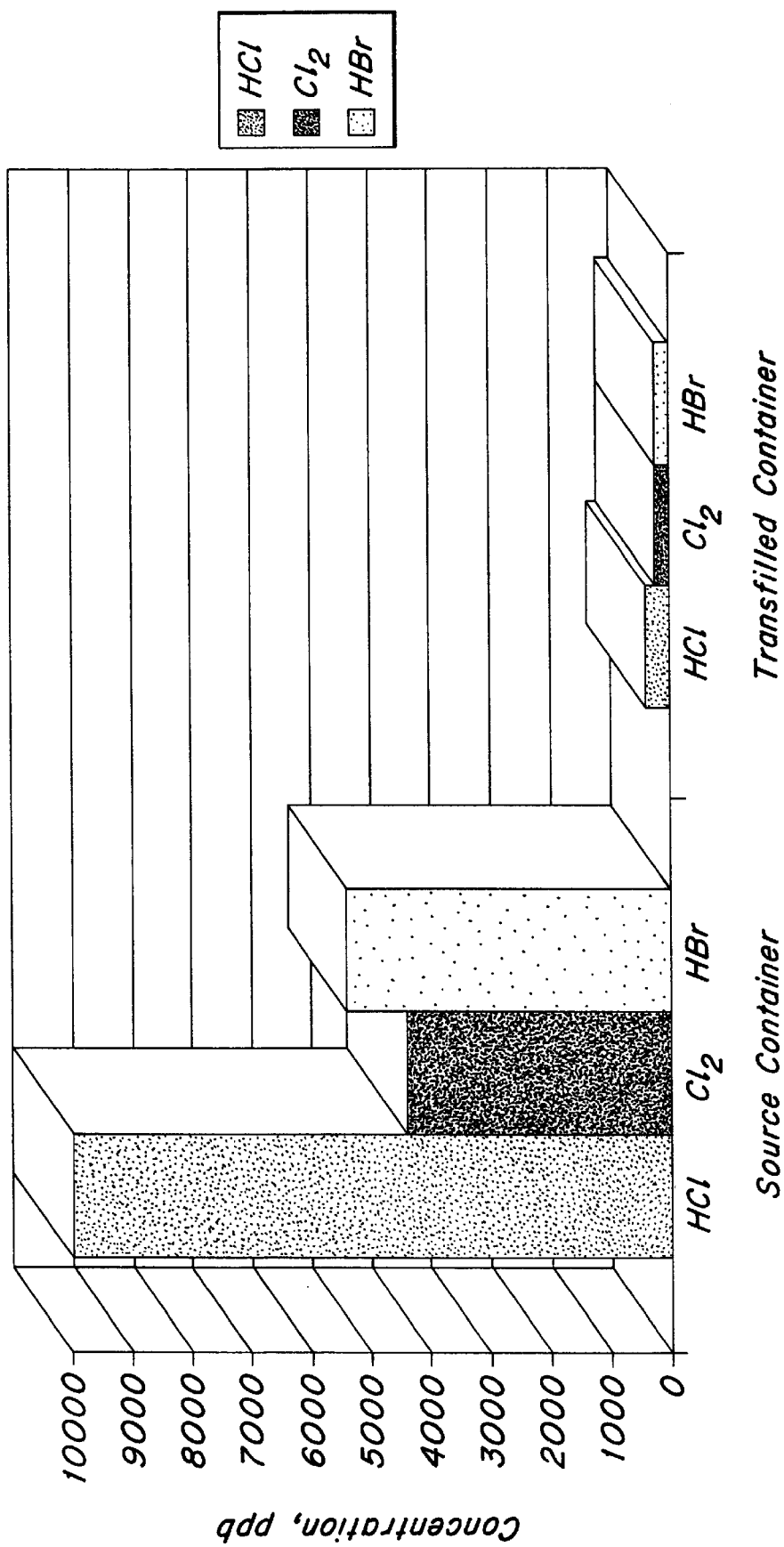
FIG. 2 is a chart showing the reduction of Iron concentration after gas phase recondensation transfilling according to the present invention.

A comparison between the liquid phase metallic impurity levels in the source and the recondensed vapor in the receiving containers is tabulated in Table 2 and illustrated in FIG. 2 for HCl, $Cl_2$, and HBr. The reduction of iron, for example, is by at least a factor of 1000, but depends on starting material.

TABLE 2

| Gas | Source Container | Transfilled Container |
|---|---|---|
| HCl | 10000 | 400 |
| $Cl_2$ | 4369 | 200 |
| HBr | 5336 | 200 |

The components of preferred apparatus embodiments of the invention will now be described in detail, component by component, as well as preferred method embodiments.

Figure 3:
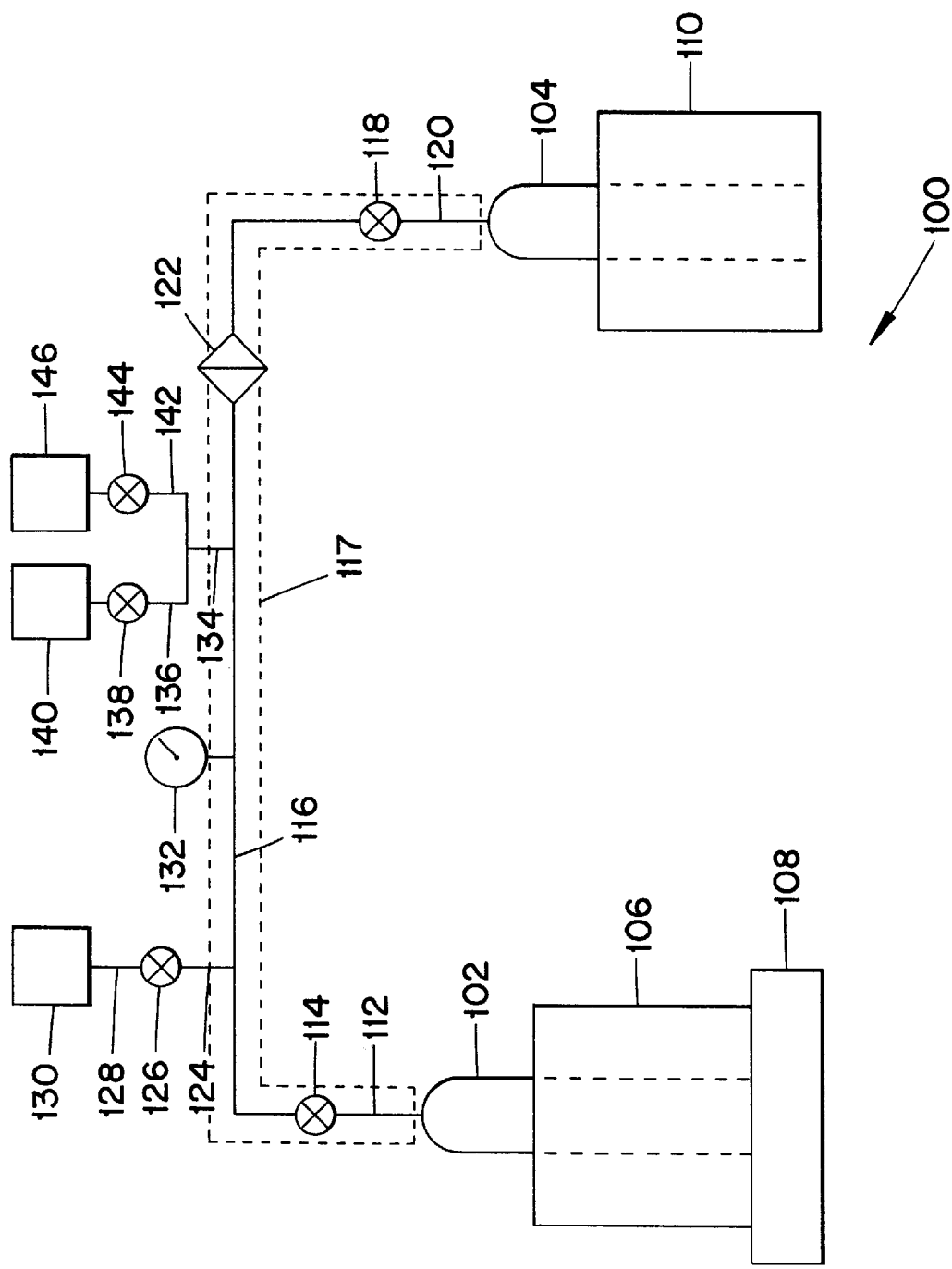
FIG. 3 is a schematic view of one embodiment of a gas phase transfilling apparatus according to the present invention.

An illustrative embodiment of a system 100 for the purification of gases by gas-phase transfilling according to the present invention is illustrated in FIG. 3. System 100 includes a source container 102 containing a gas in liquid phase and a receiving container 104 for receiving purified gas. The corrosive gas may be any gas or mixture of gases. The corrosive gas may be any corrosive gas, and is preferably HBr, $Cl_2$, HCl, $BCl_3$, $NH_3$, $WF_6$ (tungsten fluoride), or mixtures thereof.

Source container 102 is in fluid flow communication with a gas line 112. A valve 114 may be used to selectively control the rate of flow of gas from source container 102, through gas line 112, and filter downstream to a gas line 116. Valve 114 is preferably the container valve for source container 102.

Gas line 116 leads from valve 114 downstream to a valve 118. Valve 118 may be used to selectively control the rate of flow of gas from gas line 116, through a gas line 120, and to receiving container 104. Valve 118 is preferably the container valve for receiving container 104.

Gas line 116 may optionally be provided with a filter 122 for filtering particulate impurities from the gas flowing in gas line 116, although the filter must be selected to avoid more impurities being generated. As will be readily apparent to one of ordinary skill in the art, filter 122 may be chosen to filter particles of any desired size from gas flowing in gas line 116, depending on the needs for the system 100, by selecting a filter with an effective pore size smaller than the size of the particles which must be filtered from the gas flowing in gas line 116. For many corrosive gases, it is preferred to avoid the use of any filter.

System 100 preferably is constructed to maintain corrosive gas flowing from source container 102 to receiving container 104 in only gas phase until the corrosive gas is inside the receiving container. Applicants herein have discovered that maintaining the corrosive gas flowing from source container 102 to receiving container 104 in only gas phase until the corrosive gas is within the receiving container dramatically decreases the concentration of metallic impurities in the corrosive gas from the source container to the receiving container. One apparatus embodiment of the present invention which accomplishes this goal is illustrated in FIG. 3, although other embodiments of the present invention which maintain a gas flowing from a source container to a receiving container in only gas phase until the gas is inside the receiving container are within the scope of the invention.

In the embodiment of the present invention illustrated in FIG. 3, system 100 accomplishes the aforementioned goal by including apparatus which maintains a gas-phase concentration gradient of the gas between source container 102 and receiving container 104. More specifically, system 100 includes apparatus which maintains a temperature differential, and therefore a pressure differential, between source container 102 and receiving container 104, the apparatus maintaining the gas in gas phase when the gas is transferred from the source container to the receiving container, and liquefying the gas when the gas is in the receiving container. The apparatus may include heaters, insulators, and chillers, arranged in system 100 such that the aforementioned goal is accomplished.

The embodiment of the present invention illustrated in FIG. 3 preferably includes source container 102 preferably partially immersed in a heater or heated bath 106 which maintains the gas within the source container at a desired temperature above the boiling temperature of the gas. This temperature preferably ranges from about 0° F. (−17.8° C.) to about 100° F. (37.8° C.), more preferably from about 50° F. (10° C.) to about 90° F. (32.2° C.), and even more preferably about 70° F. (21.1° C.). Heater or heated bath 106 includes hardware and/or software to monitor, maintain, and control the temperature of the gas within source container 102.

The embodiment of the present invention illustrated in FIG. 3 preferably includes receiving container 104 partially immersed in a chiller or cooled bath 110 which maintains the gas within the receiving container at a desired temperature, either constant or variable, to liquify the gas once it has flowed into the receiving container. The temperature is preferably maintained at temperatures ranging from about 14° F. (−10° C) to about −112° F. (−80° C.), more preferably ranging from about −22° F. (−30° C.) to about −76° F. (−60° C.), and even more preferably about −40° F. (−40° C.). Chiller or cooled bath 110 includes hardware and/or software to monitor, maintain, and control the temperature of the gas within receiving container 104. A scale 108 is provided to measure the weight of the liquid-phase gas within source container 102, and to thereby monitor when transfilling of the gas from the source container to receiving container 104 is complete.

Gas lines 112, 116, and 120, valves 114, 118, and, when used, filter 122, are preferably maintained at a temperature sufficient to maintain the gas within these elements in only gas phase. A controllable heater (not shown), insulation (not shown), or exposing these elements to the ambient environment are preferably used for maintaining the gas flowing through these elements in only gas phase.

The temperature ranges presented above may be varied, depending on the particular gas which is purified using a system according to the present invention, as will be readily appreciated by those of ordinary skill in the art.

The illustrative embodiment of the present invention in FIG. 3 further includes a gas line 124 in fluid communication with gas line 116 and a valve 126. Valve 126 selectively controls the flow of fluid to gas line 124 from a source 130 of gas through a gas line 128. Source 130 of gas is preferably a source of filtered nitrogen gas ($N_2$), as described further below.

A pressure gauge 132 is optionally provided to monitor and display the fluid pressure in gas line 116.

A gas line 134 is in fluid flow communication with gas line 116 and includes two gas line branches 136, 142. Gas line branch 136 connects gas line 134 and a valve 138. Valve 138 selectively controls the flow of fluid to a vacuum source 140, as described in more detail below. Gas line branch 142 connects gas line 134 and a valve 144. Valve 144 selectively controls the flow of fluid from a scrubber source 146, as described in more detail below.

All of the valves in system 100 may be controlled manually or automatically under the control of an automatic control system, computer, or the like, as would be readily apparent to one of ordinary skill in the art.

A method for purifying corrosive gases of metallic impurities according to an exemplary embodiment of the invention is described with reference to FIG. 3. The source container 102 is placed in heated bath 106 and allowed to equilibrate before starting. The heated bath is preferably set to about 70° F. (21.1° C.), although other temperatures may be used without departing from the present invention. Receiving container 104 is cooled and also allowed to equilibrate. The cooled bath is preferably set to about −40° F. (−40° C.), although other temperatures may be used without departing from the present invention. Source container 102 and receiving container 104 are connected by gas line 116. Gas line 134 is connected to nitrogen source 130, to vacuum source 140, and to scrubber 146. System 100 is vacuum purged several times to remove all traces of air by opening valve 138. The pressure is monitored by pressure gauge 132. Valve 138 is closed, valve 114 is opened, and some amount of gas is vented to scrubber 146 to condition system 100. Once this is completed, valve 144 is closed and the gas is allowed to boil in source container 102, enter gas line 116, and to enter receiving container 104 for the gas to recondense in the receiving container because of the temperature in the receiving container. The amount of transfilled gas is monitored by scale 108.

The rate of vapor condensation is governed by the heat of vaporization of the gas. Additionally, the change in pressure and change in temperature between the source and receiving containers also control the rate of vapor condensation. Once transfilling is complete (or approximately 90% of the source has been transfilled) valves 114, 118 are closed and the system is vented to scrubber 146 and vacuum purged to remove all traces of corrosive gas.

The inventors herein have discovered that the keys to metal-free gas-phase transfilling include the following:
(1) Cleaning of every part which is exposed to both air and the corrosive gas before every filling; and
(2) Controlling of the flow rate and the temperature of the receiving container 104 and gas line 116 so as not to create a substantial amount of mist in the gas stream.

The detailed steps of gas-phase transfilling according to an exemplary embodiment of the invention include the following:
(1) The source cylinder 102 is preferably free of internal corrosion. This can be checked by metal analysis in the gas phase at the filling flow rate.
(2) Valves 114, 118 should be washed by an on-board cleaning method to avoid metal contamination in the gas phase from either valves. One suitable method of washing by on-board cleaning is disclosed in U.S. Pat. No. 5,591,273, issued Jan. 7, 1997, to Tsukamoto et al., entitled Process for Distributing Ultra High Purity Gases with Minimized Contamination and Particulates, which is incorporated herein by reference.
(3) The connection of source cylinder 102 to gas line 116 should be washed by appropriate cleaning agent, such as those used in the on-board valve cleaning process described above, before every filling.
(4) Receiving cylinder 104 should be passivated by 1 $kg/cm^2$ matrix gas, preferably for more than twelve hours.
(5) Receiving cylinder 104 and gas line 116 should be vacuumed before connecting gas line.
(6) The filling flow rate must be optimized for each source cylinder volume. In the case of a HBr 101 source cylinder 102, the transfilling flow rate should be controlled to be less than 3.5 standard liters/minute (slm).
(7) Gas line 116 should be heated up and maintained at a temperature sufficiently high to maintain the gas in only gas phase until it is in receiving container 104.
(8) The temperature of the gas in receiving container 104 should be optimized so that the transfilled gas remains in gas phase until within the receiving container, yet recondensed when in the receiving container.
(9) The vaporization of the liquid-phase gas from the source container should be stopped before the liquid is depleted in the source container.

EXAMPLE

In order to provide metal-free liquid HBr for material evaluation, and also as a first step for production-scale gas phase transfilling, gas phase transfilling was performed using a 300 ml PTFE coated high pressure vessel as a receiving container to remove the possibility of metal contribution from corrosion of the receiving container. High purity liquid HBr containing a Fe concentration of less than 10 wt.ppb was obtained after performing gas-phase transfilling according to the present invention.

1. Selection and evaluation of a receiving container

A high pressure container was used which exhibited no internal leak at pressures at least up to 20 bar, even when experiencing temperature change, and exhibited substantially no metal leaching from its internal liquid contact surfaces. A commercial container from Taiatsu Glass Co. Ltd. was selected as a receiving container because it is leak-proof up to 60 $kg/cm^2$. In order to confirm its leak-tightness, even after temperature changes between −80° C. and room temperature, $CO_2$ was transfilled into the container until $CO_2$ was solidified in it by cooling it down to −80° C. with a cooling bath. The container was then heated up by removing the cooling bath, and the internal pressure was monitored. No leakage was detected even at 50 bar and after the above temperature change.

Metal leaching by 2% $HNO_3$ from the PTFE inner cup of this receiving container was analyzed, and no transition metals were detected over 1 ppb.

Based on these results, the container was thought to be suitable for gas-phase transfilling. Alternatively, a stainless steel cylinder having internal coatings of nickel phosphide, discussed above, may be used, except when ammonia is being purified, in which case aluminum-coated cylinders could be used.

2. Gas transfilling procedure

The cylinder valve of the source cylinder (10L SS) was cleaned. After the source cylinder was connected to the gas transfilling line, cycle purge was applied, and then the whole gas line was purged with filtered $N_2$ continuously. A high pressure container (Taiatsu Glass Co. Ltd.) as a receiving container was separately evacuated for 30 min. before connecting to the gas line. A manifold which connects the receiving container and the gas line was washed with a washing solution which dried quickly and completely, comprising water and acetone, and dried with $N_2$ after every experiment. After connecting the clean manifold and the evacuated receiving container to the gas line, the receiving container was immersed in −10° C. (14° F.) cooling bath up to the half of its height. The gas line and the manifold were heated up to 35° C. (95° F.) in order to avoid the condensation of the HBr in the gas line, manifold, and receiving container neck. A thermocouple for the heater control was installed at the backside of the receiving container needle valve. The source cylinder was left at ambient temperature.

During the transfilling procedure, the receiving container was initially immersed in the cooling bath at −70° C. Under this condition, the receiving container's needle valve regulated a large pressure difference, from 20 bar in the source container to less than 1 bar in the receiving container, so that the needle valve itself was gradually cooled down, and frequent adjustment of the needle valve was required. This caused condensation of HBr, i.e., mist generation, and the inside of the needle valve was most likely corroded. In addition, frequent adjustment of the needle valve most likely generated metal particles which were released into the gas-phase HBr flow. Therefore, the temperature of the receiving container was increased to −10° C., increasing the pressure downstream of the receiving container's needle valve to 8–10 bar. Under this condition, frequent flow adjustment of the needle valve was no longer necessary.

After the evacuation of the main gas line and the manifold, gas phase HBr was allowed to flow from the source cylinder to the receiving container at the flow rate of 0.5 slm. From 100 g to 200 g liquid HBr was transfilled at one time.

3. Liquid phase metal analysis

After gas phase transfilling, all of the HBr gas was withdrawn from the receiving container at 300 ccm and introduced into two PFA impingers, each of which was already filled with 100 ml of DI water. All the HBr gas evaporated from the receiving container was hydrolyzed in the two containers, i.e., 200 ml of water in total. The inner PTFE cup of the receiving container was then removed from the stainless steel outer body, and the residue in the PTFE inner cup was washed with 50 cc of 2% $HNO_3$. The metal concentration in the 200 ml of HBr hydrolyzed solution and the residue in the washing solution were separately quantified by graphite furnace atomic absorption spectroscopy (GFAAS), inductively-coupled plasma mass spectroscopy (ICPMS), or inductively-coupled plasma atomic emission spectroscopy (ICP AES).

4. Gas phase metal analysis

Filtration was applied to sample the gas withdrawn from the source cylinder, and the metal analysis was conducted by GFAAS. Membrane filters (PVDF, 47 mm) for sampling were washed by concentrated aqua regia, and dried in a class 100 clean bench. The prewashed filter was set in a polypropylene filter holder. After particulate impurities in the gas-phase HBr were trapped, the membrane filter was washed by diluted aqua regia, and this washing solution was analyzed by GFAAS.

During the above procedure, it was found that the manifold connecting the receiving container and the gas line was easily contaminated with air and moisture when the receiving container was connected and disconnected. Therefore, both the manifold and the receiving container were purged with dried $N_2$ through the main transfilling line. However, these two parts contain large dead volume themselves, and are not easily purged well even if they are contaminated by air. During the cycle purge of these two parts, residual moisture and air can be introduced from them into the main transfilling line. Furthermore, the valves and fittings near the manifold were heavily corroded after transfilling. Therefore, the manifold was removed from the gas line, and washed with a washing solution which dried quickly and completely, comprising water and/or acetone. The washed manifold was continuously purged during storage. This cleaning procedure for the manifold was repeated after every subsequent transfilling procedure. The receiving container was separately evacuated and purged with $N_2$ before each transfilling procedure.

It has also been discovered that it is very important to control the flow rate of the gas withdrawn from the source cylinder in order to ensure only vapor-phase transfilling. 0.5 slm of HBr can be easily supplied from a 10L cylinder containing 50 kg of HBr, without significant mist generation. The flow rate is optimized depending on the size of the mother cylinder, the amount of HBr liquid in the mother cylinder, and temperature control.

Metal impurity contents in liquid-phase HBr in the source cylinder and that in the receiving container cylinder are compared in Table 3 as "before" and "after", respectively. The Fe concentration in liquid-phase HBr was reduced down to 2 wt.ppb, which is substantially the same as the Fe concentration detected in the gas-phase HBr flow through the transfilling line. This demonstrated the ultimate capability of gas transfilling for metal impurity removal.

TABLE 3

| Element | Before (wt., ppb) | After (wt., ppb) |
|---------|-------------------|------------------|
| Al | 12.60 | 0.09 |
| Ca | 35.40 | 1.81 |
| Co | 26.00 | 3.47 |
| Cr | 415.00 | 0.43 |
| Cu | N.D. | 0.89 |
| Fe | 5320.00 | 1.87 |
| Mn | 15.30 | 7.71 |
| Na | 6.19 | 0.24 |
| Ni | 680.00 | 0.74 |
| Zn | 11.60 | 2.24 |

While the invention has been described in detail with reference to preferred embodiments thereof, it will be apparent to one skilled in the art that various changes can be made, and equivalents employed, without departing from the scope of the invention.

What is claimed is:

1. An apparatus for purifying a liquid-phase mixture including a compound and at least one impurity, comprising:

a first container for holding said liquid-phase mixture;

a second container for holding purified compound;

a first fluid line in fluid communication with said first container and with said second container for transferring gas-phase compound from said first container to said second container;

a vacuum source in fluid communication with said first fluid line;

a scrubber in fluid communication with said first fluid line;

a temperature controller for maintaining a temperature differential between said first container and said second container, said temperature controller maintaining the compound in gas phase when said compound is transferred from said first container to said second container, and liquefying said compound when said compound is in said second container; and a heater in heat transfer communication with said first fluid line, wherein when gas-phase compound is being transferred through said first fluid line, said heater maintains said compound in gas phase until said gas-phase compound has entered said second container;

whereby when said gas-phase compound is transferred from said first container to said second container, said at least one impurity is not transferred from said first container to said second container.

2. An apparatus according to claim 1, wherein said temperature controller comprises a container heater in heat transfer communication with said first container.

3. An apparatus according to claim 2, wherein said container heater is a heated bath, said first container being at least partially immersed in said heated bath.

4. An apparatus according to claim 1, wherein said temperature controller comprises a chiller in heat transfer communication with said second container.

5. An apparatus according to claim 4, wherein said chiller is a cooled bath, said second container being at least partially immersed in said cooled bath.

6. An apparatus according to claim 4, wherein said chiller cools said second container to a temperature ranging from about 0° C. to about −100° C.

7. An apparatus according to claim 6, wherein said chiller cools said second container to a temperature ranging from about −10° C. to about −70° C.

8. An apparatus according to claim 1, wherein said temperature controller comprises a heater in heat transfer communication with said first fluid line, wherein when gas-phase compound is being transferred through said first fluid line, said heater maintains said compound in gas phase until said gas-phase compound has entered said second container.

9. An apparatus according to claim 8, further comprising a valve for controlling fluid flow into and out of said second container, wherein when gas-phase compound is being transferred through said first fluid line, said heater maintains said compound in gas phase until said gas-phase compound is downstream of said valve.

10. An apparatus according to claim 1, further comprising a first valve for controlling fluid flow into and out of said first container and a second valve for controlling fluid flow into and out of said second container.

11. An apparatus according to claim 1, further comprising a second fluid line in fluid communication with said first fluid line for attachment to a vacuum line.

12. An apparatus according to claim 11, further comprising a third fluid line in fluid communication with said first fluid line for attachment to a scrubber line.

13. An apparatus according to claim 12, further comprising a fourth fluid line in fluid communication with said first fluid line for attachment to a flushing gas line.

14. An apparatus according to claim 1, further comprising a device for measuring the pressure in said first fluid line.

* * * * *